US012674443B2

(12) United States Patent
Arnason

(10) Patent No.: US 12,674,443 B2
(45) Date of Patent: Jul. 7, 2026

(54) MULTI-PIPING SPIRAL-PUMP FOR TREATING FOOD ITEMS

(71) Applicant: Lambhusasund EHF., Akranes (IS)

(72) Inventor: Ingolfur Arnason, Akranes (IS)

(73) Assignee: LAMBHUSASUND EHF., Akranes (IS)

( * ) Notice: Subject to any disclaimer, the term of this patent is extended or adjusted under 35 U.S.C. 154(b) by 638 days.

(21) Appl. No.: 17/796,038

(22) PCT Filed: Jan. 28, 2021

(86) PCT No.: PCT/IS2021/050001
§ 371 (c)(1),
(2) Date: Jul. 28, 2022

(87) PCT Pub. No.: WO2021/152640
PCT Pub. Date: Aug. 5, 2021

(65) Prior Publication Data

US 2023/0051759 A1 Feb. 16, 2023

(30) Foreign Application Priority Data

Jan. 28, 2020 (IS) .......................................... 050290

(51) Int. Cl.
*F04B 19/12* (2006.01)
*F03B 17/06* (2006.01)

(52) U.S. Cl.
CPC ............ *F04B 19/12* (2013.01); *F03B 17/062* (2013.01); *F03B 17/063* (2013.01)

(58) Field of Classification Search
CPC ....... F04B 19/12; F03B 17/062; F03B 17/063
See application file for complete search history.

(56) References Cited

U.S. PATENT DOCUMENTS

| | | | | | |
|---|---|---|---|---|---|
| 210,023 | A | * | 11/1878 | Gray | B05B 3/06 415/88 |
| 932,446 | A | * | 8/1909 | Combs | F04B 17/02 417/334 |
| 1,005,664 | A | * | 10/1911 | Snyder | B27L 5/025 417/94 |
| 1,114,603 | A | * | 10/1914 | Giger | F04F 1/06 417/137 |

(Continued)

FOREIGN PATENT DOCUMENTS

| | | | | | |
|---|---|---|---|---|---|
| DE | 10100534 | A1 | * | 7/2002 | F04B 19/12 |
| DE | 10231008 | A1 | * | 1/2004 | F03B 13/00 |

(Continued)

OTHER PUBLICATIONS

Machine Translation of NO330892 (Year: 2011).*

(Continued)

*Primary Examiner* — Christopher S Bobish
(74) *Attorney, Agent, or Firm* — Tarolli, Sundheim, Covell & Tummino LLP

(57) ABSTRACT

The present invention relates to a method and a device for treating and/or transporting food items. The apparatus and method are designed to facilitate treating animals or food items in liquid. The device of the present invention is designed as a spiral pump with two or more channels wound around a horizontal axis. The apparatus of the present invention and the use thereof provides a method to treat living or slaughtered animals or food items in a spiral pump.

11 Claims, 3 Drawing Sheets

(56) References Cited

U.S. PATENT DOCUMENTS

| | | | | | |
|---|---|---|---|---|---|
| 1,720,999 | A * | 7/1929 | Cawley | F04B 19/12 | 416/177 |
| 2,190,968 | A * | 2/1940 | Acree | F04B 19/12 | 417/61 |
| 3,489,074 | A * | 1/1970 | Farkas | A23B 2/001 | 99/360 |
| 3,586,510 | A * | 6/1971 | Farkas et al. | A23L 5/11 | 99/452 |
| 4,010,647 | A * | 3/1977 | Kissell | G01N 1/22 | 73/864.34 |
| 4,596,286 | A * | 6/1986 | Stetler | F28D 11/04 | 165/92 |
| 4,830,865 | A * | 5/1989 | McFarlane | A23B 2/465 | 426/399 |
| 5,366,341 | A * | 11/1994 | Marino | F03B 13/1815 | 60/507 |
| 5,556,765 | A * | 9/1996 | Dedolph | B01J 19/0066 | 366/135 |
| 10,364,830 | B2 * | 7/2019 | Ehrnberg | F03B 17/061 | |
| 2013/0134703 | A1 * | 5/2013 | Williams | F04D 29/181 | 285/124.1 |

FOREIGN PATENT DOCUMENTS

| | | | |
|---|---|---|---|
| NO | 330892 | B1 * | 8/2011 |
| WO | 2005085521 | A1 | 9/2005 |
| WO | 2018185791 | A1 | 10/2018 |
| WO | 2020012509 | A1 | 1/2020 |
| WO | 2020012510 | A2 | 1/2020 |

OTHER PUBLICATIONS

International Search Report and Written Opinion dated Feb. 9, 2021 for corresponding International Application No. PCT/IS2020/050019.

Iceland Search Report dated Jul. 29, 2020 for corresponding Application No. SE 2020 00887.

* cited by examiner

MULTI-PIPING SPIRAL-PUMP FOR TREATING FOOD ITEMS

RELATED APPLICATIONS

The present application is a U.S. National Stage application under 35 USC 371 of PCT Application Serial No. PCT/IS2021/050001, filed on 28 Jan. 2021, which claims priority from IS Patent Application No. 050290, filed 28 Jan. 2020, the entirety of both of which are incorporated herein by reference.

FIELD OF THE INVENTION

The invention relates to a method and apparatus for treating and transferring living or slaughtered animals or food items.

BACKGROUND

In the continuously developing field of food processing improved methods and devices are needed to increase speed of processing and reduce cost and environmental footsteps. Processing steps such as cooling, rinsing, transferring, and bleeding of freshly slaughtered animals need to be able to facilitate fast, efficient but relatively gentle handling and transportation of the animals and food products through these processes.

A part of food processing steps includes bleeding of slaughtered animals, cooling and treating slaughtered animals and food items for bacteria, but one of the problems in the food industry is getting rid of bacteria such as *Listeria* in Salmon and *Salmonella* in chicken. For *Listeria*, the solution has been to freeze the salmon to get rid of these bacteria. This however poses a problem for delivery of fresh salmon for the market.

Spiral pumps have been used to transport and treat food items delicately through a closed environment in a low-pressure system. Such pumps are ideal for pumping water-mixed material such as raw and cooked shrimp, shellfish, and pelagic and other small fish according to the principle of Archimedes. By rotating slowly, the pump facilitates transport and/or elevation of water and material through pipes, without using any propeller. The food items are gently conveyed in a closed environment. The system also prevents the items from being exposed to the outside environment.

WO 2018/185791 discloses a spiral pump with a tubing that is helically wound around a frame structure which rotates around a horizontal axis further having a second tubing, which is wound through the inlet of the first tubing and into the second winding. The method is performed by introducing a calculated amount of liquid and food items into the first winding of the spiral pump and then rotating the tubing only one circle at the time to move the food items in the liquid into the second winding before introducing additives, such as ozone, into the second winding through a second tubing for killing bacteria and for transporting items from one location to another at the same time.

WO 2020/012509 discloses an apparatus and a method to treat food items in a spiral pump, where the food items are treated cycle by cycle in the pump at various speed in each cycle and or with a rocking movement of the pump, where the tubing is wound around the frame of the pump or with other shape to increase movement of the food items in the pump.

SUMMARY OF THE INVENTION

One of the problems with prior art pumping devices for transferring and treating food items is providing continuous suction at the in-feeding end, when using pumps according to the principle of Archimedes. For such pumps, a pulsing motion of the pump often results from in-feeding and out-feeding as well as rotating material through the pump. The present invention provides a method and a device for treating, processing and/or transporting living or slaughtered animals or food items in a pumping device using the principle of Archimedes. The apparatus and method are designed to facilitate treating living or slaughtered animals or food items in liquid, where two or more channels or tubes are wound or formed together in a spiral for sequential and repeated feeding at the infeed end through a plurality of in-feed openings. The new device has a loading structure connected to each of a plurality of tubing making up the pump, where the loading structure sequentially and repeatedly feeds food items in liquid into each of the plurality of the tubing. Furthermore, the loading structure makes sure that a first tubing is fed with food items in liquid and air to provide a winding with less than 50% of food items in liquid and more than 50% of air phase, wherein after filling the first winding of a first tubing, the loading structure feeds the next tubing in the same manner. This is continued for the number of tubing in the pump and then the process is repeated, providing a device and method where the pump has a bulk of food items in liquid in different positions in the pump and where the pump is at any moment booth feeding in and exiting food items in liquid, thereby reducing pulsing motion of the pump and maintaining a more continuous suction of items into the pump. An outfeed collecting structure connected to the outfeed end of each of the tubing in the multi-tubing pump receives the food items in liquid and the air-phase in the pump at the out-feed end and exits the food items in liquid. Optionally, the outfeed collecting structure also separates the air-phase from the food items in liquid and is able to re-direct the air-phase back to the loading structure for re-use.

The principle of Archimedes ensures that if the total amount of liquid, food items and additives does not exceed 50% of the volume of a winding the food items in the winding do not mix with the food items in the next winding and the air filling about 50% or more of the volume of the winding pushes the content of a prior winding to the next one. The method and device of the present invention uses a spiral pump to cool down and rinse food items or even to facilitate bleeding of newly slaughtered animals, such as fish or chicken.

The new device can optionally be made from or formed in metal, such as steel in case the pump should be made with a larger diameter tubing. In such case, the tubing itself is the supporting structure of the tubing and is connected to a driving means to rotate the pump. Such a pump can be formed having an alternately changing diameter of the tubing of the pump to alter the pressure in the tubing and to alter the flow of liquid against the living or slaughtered animals or food items. By narrowing and widening the diameter of the tubing, the flow of liquid in the pump will function as mechanical forwarding of the liquid which increases the stimulus or irritation on the surface of the items to be treated.

The device and method of the present invention is further suitable for reducing or eliminating parasites such as sea lice off farmed salmon by pumping salmon from one pen to another or to separated space within a pen through at least one pumping device. By pumping salmon from a pen through the multi-spiral pump of the invention having a pumping liquid at different temperature than in the temperature of the pen, the salmon is subjected briefly to a temperature difference (ΔT), which results in detachment of the sea lice from the skin of the fish. As the pumping device is neither complicated nor space consuming the apparatus can be set up on a structure next to a pen or on the deck of a vessel and due to the suction properties of the first pumping device of the invention farmed fish can be effectively sucked out of the pen and into the first pump. The detachment of lice from salmon fish is obtained due to the size difference of the salmon fish and the sea lice, as well as the fat content of salmon fish, because the salmon fish can tolerate the temperature difference for a short period of time, but the sea lice cannot.

The combination of one or more of the following embodiments provide the solutions presented herein: a) winding two or more tubing in a spiral for serial and continuous feeding of food items in liquid through each of the tubing in the pump thereby increasing efficiency and providing continuous suction from a reservoir, b) providing an in-feed or loading mechanism for serial and continuous in-feed of food items in liquid and air phase in desired properties to each of the windings in the multi-winding pump, and c) using the off-loading mechanism to separate the air-phase from the food items and liquid for redirection of the air-phase into the loading mechanism for reuse, which provides the improved device and method of the present invention resulting in increased efficiency and stable suction of items into the pump and reduced pulsing movement of the spiral pumps in motion.

It is an object of the present invention to overcome and/or ameliorate the aforementioned drawbacks of the prior art and to provide an improved and/or alternative and/or additional method or device for facilitating processing or treatment of living or slaughtered animals or food items using spiral pump(s).

It is one preferred object of the present invention to provide a method and device to facilitate treatment of food items using the apparatus of the present invention. Moreover, it is a preferred object of the present invention to provide a method and device, preferably designed as a multi-channel spiral pump having two or more channels or tubing formed or wound in a spiral to increase efficiency, providing stable suction and reducing pulsing movement of the pump. Another preferred object of the present invention is to provide a device having a design where the in-feeding end for the plurality of the channels of the apparatus is designed to serially and continuously feed each of the channel in the multi-tubing pump with both air-phase, liquid and food items. One preferred embodiment of the present invention is to provide an out-feed mechanism for separating the air phase from the food items and the liquid to redirect the air back to the in-feed structure for reuse. An important aspect of the present invention providing an apparatus with alternately changing diameter in each channel to alter the flow of liquid in each channel and thereby increasing the treatment effect as the food items are pumped through the apparatus.

The object(s) underlying the present invention is (are) particularly solved by the features defined in the independent claims. The dependent claims relate to preferred embodiments of the present invention. Further additional and/or alternative aspects are discussed below.

Thus, at least one of the preferred objects of the present invention is solved by an apparatus for transferring and/or treating food items in liquid media. The apparatus comprises i) two or more channels, each channel further comprising an in-feed end and an out-feed end, wherein each channel is formed into a spiral shaped channel having three or more windings, ii) a loading structure connected to the in-feed end of each of the two or more spiral shaped channels for loading each first winding of the two or more spiral shaped channels with the food items in liquid media, and iii) means for rotating the spiral shaped channels. Furthermore, the loading structure is adapted to sequentially and repeatedly feed food items in liquid media into the two or more spiral shaped channels, while there are food items to be treated.

Another preferred object of the present invention is solved by a method for transferring and/or treating food items in liquid media, the method comprising:

a) providing a pumping device further comprising i) two or more spiral shaped channels, each channel further comprising an in-feed end and an out-feed end, each channel having three or more windings, ii) a loading structure connected to the in-feed end of each of the two or more spiral shaped channels for loading each first winding of the two or more spiral shaped channels with the food items in liquid media, and iii) means for rotating the spiral shaped channels,
b) rotating the two or more spiral shaped channels to an in-feeding position for a first spiral shaped channel of the apparatus, wherein the inlet for the first spiral shaped channel is aligned with an outlet of the loading structure,
c) feeding food items in liquid into the first spiral shaped channel of the apparatus and feeding air/gas into the tubing,
d) sequentially performing steps b) and c) for the number of spiral shaped channels of the apparatus,
e) repeating step b to d) while there are food items to be feed into the apparatus.

One of the preferred objects of the present invention is solved by a method for treating food items in liquid media. The method comprises the steps of:

a) providing a pumping device further comprising i) three spiral shaped channels, each channel further comprising an in-feed end and an out-feed end, each channel having three or more windings, ii) a loading structure connected to the in-feed end of each of the three spiral shaped channels for loading each first winding of the three spiral shaped channels with the food items in liquid media, and iii) means for rotating the spiral shaped channels,
a) rotating the three spiral shaped channels to an in-feeding position for a first spiral shaped channel of the pumping device, wherein the inlet for the first spiral shaped channel is aligned with an outlet of the loading structure,
b) feeding food items in liquid into the first spiral shaped channel of the pumping device and feeding air/gas into the channel,
c) rotating the three spiral shaped channels to an in-feeding position for a second spiral shaped channel of the pumping device, wherein the inlet for the second spiral shaped channel is aligned with an outlet of the loading structure,
d) feeding food items in liquid into the second spiral shaped channel of the pumping device and feeding air/gas into the tubing,
e) rotating the three spiral shaped channels to an in-feeding position for a third spiral shaped channel of the pumping device, wherein the inlet for the third spiral shaped channel is aligned with an outlet of the loading structure, f) feeding food items in liquid into the third spiral shaped channel of the pumping device and feeding air/gas into the tubing, g) repeating steps b)-h) while there are food items to be feed into the first winding of one of the three spiral shaped channels of the pumping device.

Another preferred object of the present invention is solved by a method for treating living salmon fish to remove sea-lice from the fish in liquid media. The method comprises the steps of:

a) providing a pumping device further comprising i) two or more spiral shaped channels, each channel further comprising an in-feed end and an out-feed end, each channel having three or more windings, ii) a loading structure connected to the in-feed end of each of the two or more spiral shaped channels for loading each first winding of the two or more spiral shaped channels with the food items in liquid media, and iii) means for rotating the spiral shaped channels, b) rotating the two or more spiral shaped channels to an in-feeding position for a first spiral shaped channel of the pumping device, wherein the inlet for the first spiral shaped channel is aligned with an outlet of the loading structure, c) feeding food items in liquid into the first spiral shaped channel of the pumping device and feeding air/gas into the tubing, d) sequentially performing steps b) and c) for the number of spiral shaped channels of the pumping device, e) repeating step b to d) while there are food items to be feed into any winding of the spiral shaped channels of the pumping device.

In the present context the terms “channels”, “piping” and “tubing” “are used equally for referring to piping or channel structures forming the channels in a spiral shaped pump according the principle of Archimedes, where the pump has a plurality (two or more) channels, each having an in-feed and an out-feed end, where the plurality of channels are wound/formed in a spiral and where the plurality of piping is feed sequentially with items in liquid to be pumped through the spiral pump and out of the out-feed end of each channel. The piping/channels can be wound in parallel as is shown in FIG. 1C.

In the present context the terms “treating food items”, “treating food items in liquid media” and “processing or treating food items in liquid” relate to rinsing, washing, bleeding, cooling or adding substances to food items such as, but not limited to, salts, phosphates or anti-bacterial agents etc.

In the present context the terms “food items” and “living or slaughtered animals or food items” are used equally for living animals, such as salmon, and food items such as slaughtered fish or chicken, as well as for parts or animals such as aquatic animals, birds or other smaller slaughtered animals being treated in pumping devices in liquid.

In the present context the term “loading structure” refers to an in-feeding mechanism which loads each of the channels in the apparatus with food items in liquid and air or gas.

In the present context the term “outfeed collecting structure” refers to an out-feeding mechanism which receives items in liquid from each of the channels in the apparatus and delivers the items either separately or in the liquid out of the apparatus and optionally separates the air/gas phase therein from the food items in liquid.

In the present context the term “means for rotating the spiral shaped channels” refers to any drive means for rotating the channels in the apparatus to perform the pumping activity of the apparatus. Such drive means are selected from, but not limited to, a motor or a gear device.

In the present context the term “sequentially and repeatedly” in reference to feeding the apparatus of the present invention refers to feeding each channel of the apparatus with food items in liquid during rotation of the channels. After having fed food items in liquid to all channels of the two or more channels with food items in liquid and the channels have been rotated one full rotation, feeding of food items in liquid is continued into the two or more channels as long as there are food items in liquid to be fed into the apparatus.

In the present context the terms “pumping device”, “spiral pump”, and “apparatus for transferring and/or treating food items in liquid media” are used equally for the apparatus of the present invention having two or more channels for pumping, transferring and/or treating food items in liquid.

In an embodiment of the present invention the in-feed end of each of the two or more spiral shaped channels connects to the loading structure in different locations on the loading structure and wherein the loading structure is rotatable with the two or more spiral shaped channels and in-feeding only occurs when the loading structure is in a certain position or range in a 360° rotation of the two or more spiral shaped channels.

In an embodiment of the present invention the loading structure further comprises guiding means for guiding the food items in liquid media into infeed end of each of the two or more spiral shaped channels.

In an embodiment of the present invention the loading structure and is rotatable with the two or more spiral shaped channels.

In an embodiment of the present invention the in-feed end of each of the two or more spiral shaped channels connects to the loading structure in different locations on the loading structure.

In an embodiment of the present invention the loading structure is rotatable with the two or more spiral shaped channels and wherein in-feeding only occurs when the loading structure is in a certain position or range in a 360° rotation.

In an embodiment of the present invention the guiding means of the loading structure comprises channels, blades or bars for guiding food items in liquid to an in-feed opening of a channel.

In an embodiment of the present invention the apparatus further comprises an out-feed collecting structure for collecting the food items in liquid media from each of the two or more spiral shaped channels.

In an embodiment of the present invention the outfeed collecting structure further comprises means or structure to separate the food items in liquid media and an air/gas phase being feed out of the two or more spiral shaped channels.

In an embodiment of the present invention the apparatus further comprises an air/gas-duct 6 for re-directing the air/gas phase back to the loading structure.

In an embodiment of the present invention the loading structure 4 further comprises means for controlling the amount of air/gas and food items in liquid media being fed into each first winding of the two or more spiral shaped channels.

In an embodiment of the present invention the means for rotating the spiral shaped channels is a motor.

In an embodiment of the present invention the apparatus further comprises a control means for rotating the two or more spiral shaped channels.

In an embodiment of the present invention the two or more spiral shaped channels are made from hose or pipe like flexible material.

In an embodiment of the present invention the three or more windings of the two or more spiral shaped channels are wound around or in a horizontally rotating frame/support structure, wherein the tubing is formed in a spiral in connection with rotating frame/support structure.

In an embodiment of the present invention the three or more windings of the two or more spiral shaped channels are made from metal, such as steel.

In an embodiment of the present invention the metal spiral shaped channels 1 are the load bearing structure being rotated for transferring and/or treating food items in liquid media.

In an embodiment of the present invention the diameter of each spiral shaped channel 1 is narrowed and widened alternatively through the windings 8 to alternate the speed of flow in each spiral shaped channel.

In an embodiment of the present invention one or more of the windings in each spiral shaped channel is a semi-circular winding.

In an embodiment of the present invention the one or more semi-circular winding has a rectangular, pentagonal, hexagonal, heptagonal, octagonal, nonagonal, decagonal shape or where a circular winding has one or more ridges or indents in the circular shape.

In an embodiment of the present invention the method further comprises the step of separating the food items in liquid media from the air/gas, and wherein the air/gas is re-directed back to the loading structure via an air/gas-duct.

In an embodiment of the present invention the in-feed end of each of the two or more spiral shaped channels connects to the loading structure in different locations on the loading structure and wherein the loading structure is rotatable.

In an embodiment of the present invention the apparatus further comprises a duct for circulating the air/gas phase from the out-feed end of the tubing back to the in-feed end of the tubing and means injecting additional gas or air into the duct during the recirculation. This creates a closed circulation of air or gas in tubing/duct which can be beneficial for using the pump to treat food items with gasses such as ozone. The ozone is then kept contained in a closed circulation. A sensor can be placed in the duct to monitor the gas level and the duct may have a valve connected to a control computer for regulating the concentration of a gas in the duct by injections if needed. In such an embodiment an air/gas separating device at the out-feed end of the pump is used for separating the air/gas phase from the content exiting the pump and re-directed into the inlet or first winding of the pump. The air/gas may also be exited from the last winding of the pumping device via a valve using the pressure in the winding to redirect the gas back into the inlet or first winding of the pump.

In an embodiment of the present invention the treatment liquid is temperature and salt regulated/controlled.

In an embodiment of the present invention the apparatus further comprises a sensor for determining the position of the windings of the pump in each cycle of rotation.

In an embodiment to this object, the method relates to treating live fish and the reservoir is a separated area in one or more sea pen, whereas the pumping device is positioned on a mooring structure or on a vessel.

In an embodiment of the present invention the treatment of food items comprises cooling food items in liquid media.

In an embodiment of the present invention the treatment of food items comprises bleeding slaughtered animals in liquid media.

In an embodiment of the present invention the treatment of food items comprises treating the food items in liquid media with anti-bacterial agents.

In an embodiment of the present invention the apparatus is set up on a vessel or on a structure adjacent to a pen structure for farming fish.

In an embodiment of the present invention the apparatus further comprises a cooling system or a heat exchange device bringing the liquid for treating the food items to a predetermined temperature and for making the liquid a salt-controlled and temperature-controlled solution.

In an embodiment of the present invention the liquid separated in the liquid outlet of the pumping device is filtered before it is re-circulated the liquid through a heat exchange element and back to the in-feed end of the pumping device.

In an embodiment of the present invention the apparatus comprises a computing means for controlling the rotation of the pumping device and optionally the interval (time) between and/or in each rotation of the spiral shaped channels. The computing means also calculates the amount of liquid and food items, and optionally additives, fed into the first winding of each spiral shaped channel to maintain a desired volume and ratio of food items vs. liquid.

In an embodiment of the present invention the liquid for treatment of food items comprises one or more of, but not limited to water, sea water, brine, a salt-controlled and temperature-controlled solution from a cooling system, fluid ice or any combination thereof.

In an embodiment of the present invention, each helical wound channel has three to fifty windings, such as three to twenty-five windings or three to ten windings. The thickness of the tubing is determined by the amount of food items to be treated and the speed of treatment in each winding of the pump.

In an embodiment of the present invention mixing of food items, liquid and additives is performed in an in-feeding chamber for collecting items prior to transferring the food items, liquid and additives into the loading structure.

In an embodiment of the present invention the additives comprise one or more of, but not limited to anti-bacterial substances, salts, polyphosphates, or any combination thereof.

In an embodiment of the present invention ozone is fed into the mixture of liquid and food items.

DESCRIPTION OF VARIOUS EMBODIMENTS

The present invention will become more fully understood from the detailed description given hereinafter and the accompanying drawings which are given by way of illustration only, and thus, are not limitative of the present invention, and wherein.

Figure 1:
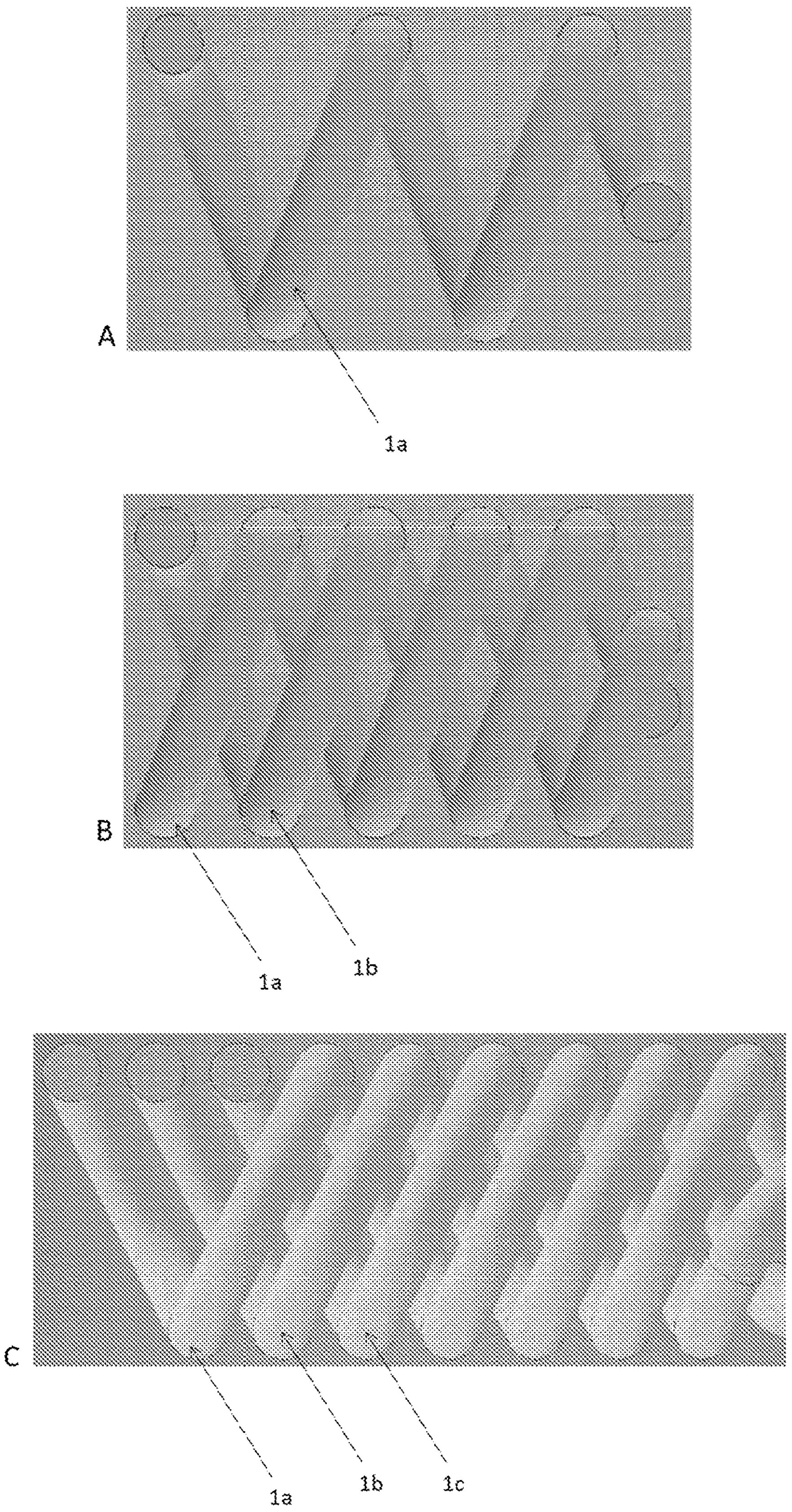
FIG. 1 is a front view spiral shaped tubing for a pump having one to three tubing wound in parallel.

FIG. 1 shows windings of a pumping device, where in FIG. 1A a single spiral shaped winding 1*a* is shown. In FIG. 1B, two parallel windings 1*a*, 1*b* are shown wound together in a helix manner. FIG. 1C, shows three parallel windings 1*a*, 1*b* and 1*c* wound together in a helix like manner.

Figure 2:
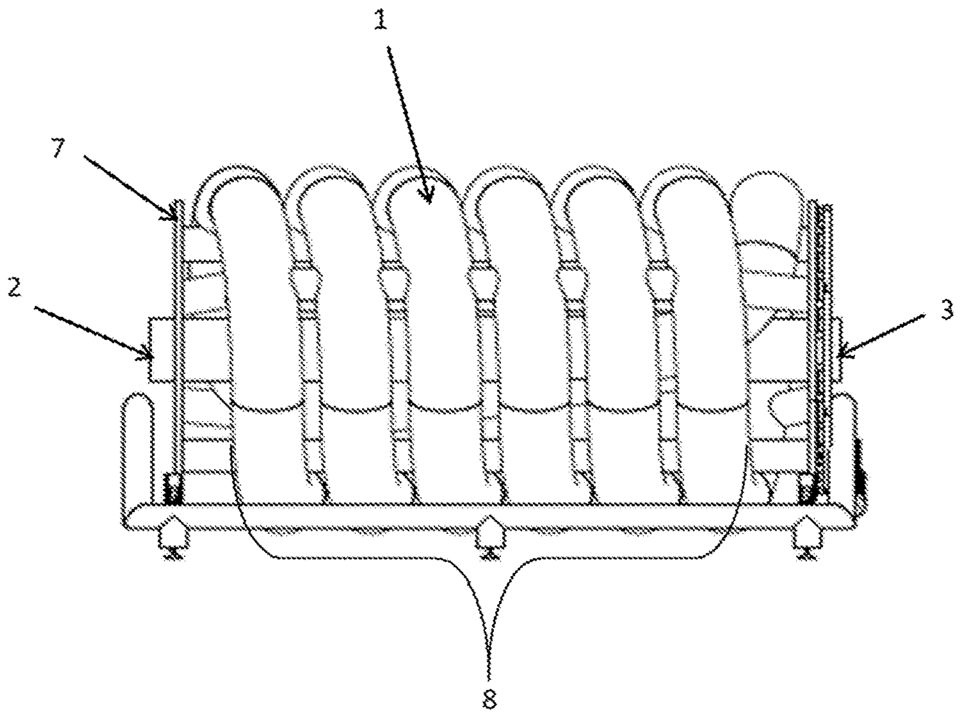
FIG. 2 is a drawing of a simple spiral pump with the inlet and the outlet ends threaded through the spiral of the pump.

FIG. 2 outlines some components of a pumping device having a helical wound tubing/channels 1 with an in-feed end 2 and an out-feed end 3. In the embodiment shown in FIG. 1 the helical wound tubing has seven windings 8 wound around and into a cylindrical frame structure 7 rotating around the horizontal central axis of the frame structure 7.

Figure 3:
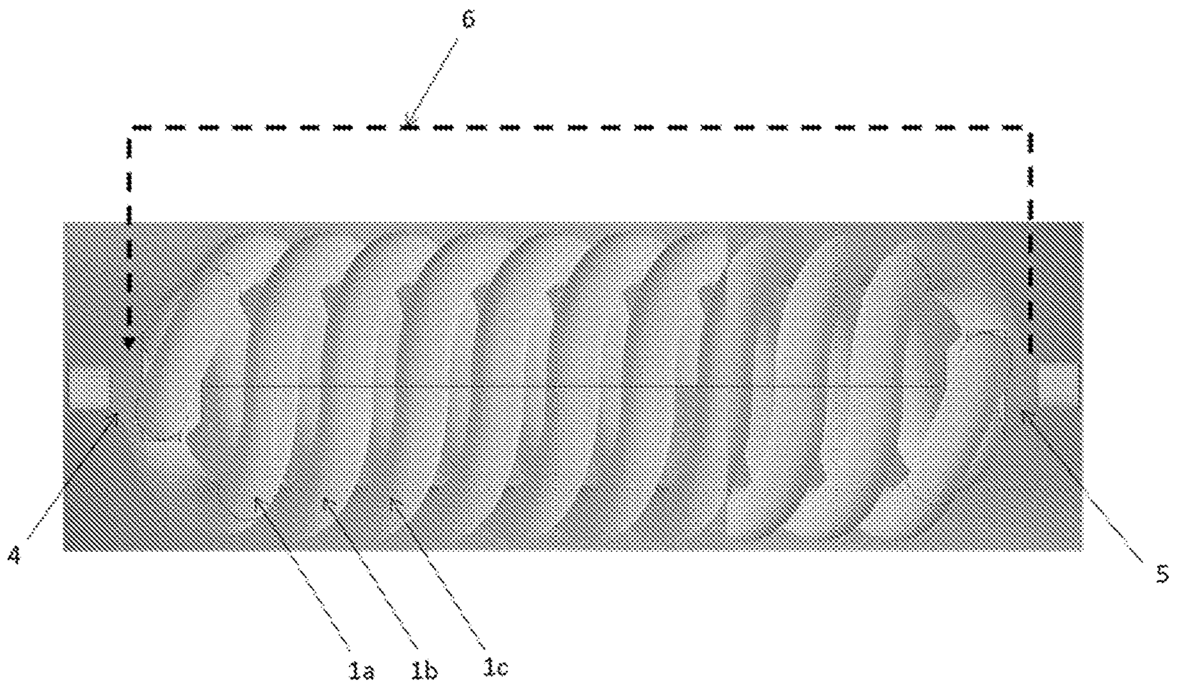
FIG. 3 is a front view of a three winding pumping device.

FIG. 3 shows an arrangement of a pumping device of the present invention with three spiral shaped channels. The pumping apparatus is designed for transferring and/or treating food items in liquid media in three parallel windings 1*a*, 1*b* and 1*c* wound together in a helix like manner. The in-feeding end for each of the three parallel windings 1*a*, 1*b* and 1*c* is connected to a loading structure 4 for loading each first winding of the three parallel wound tubing 1 with food items in liquid media. At the out-feed end of each of the three parallel wound tubing 1*a*, 1*b* and 1*c* is connected to an out-feed collecting structure 5 for collecting the air phase and food items in liquid media from each of the three parallel wound tubing 1. In this embodiment, the outfeed collecting structure has separate outlets for food items in liquid media and the gas phase. The air/gas is re-directed back to the loading structure 4 via an air-duct 6.

Figure 4:
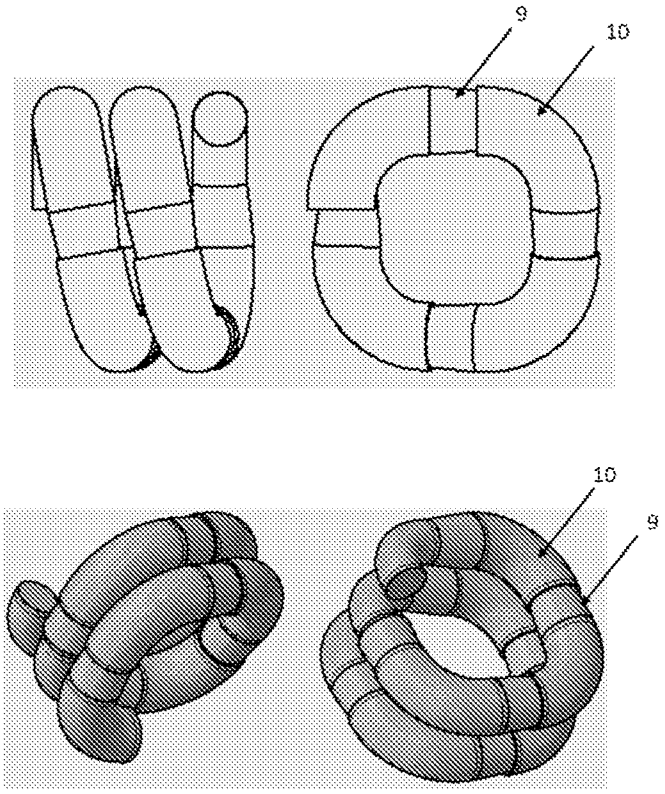
FIG. 4 is a perspective view of rectangular spirals according to one embodiment of the invention with changing diameter of the tubing.

FIG. 4 shows rectangular spirals according to one embodiment of the invention with changing diameter of the tubing. Indents or narrowing portions 9 and wider portions 10 of the tubing are continuously alternated in the formation of the spiral to form the spiral pump. The rectangular shape gives an added effect of changing the streamflow of the liquid in the pump and increases the surface stimulation of the treatment liquid and the interaction with the surface of the tubing and other fish.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The invention claimed is:

1. An apparatus for transferring and/or treating food items in liquid media, the apparatus comprising:

two or more channels 1, each channel further comprising an in-feed end 2 and an out-feed end 3, wherein each channel is formed into a spiral shaped channel having three or more windings 8 and wherein the two or more channels are wound together in parallel, a loading structure 4 connected to the in-feed ends of all of the two or more spiral shaped channels 1 for loading each first winding 8 of the two or more spiral shaped channels 1 with the food items in liquid media, wherein the in-feed ends of the two or more spiral shaped channels 1 connect to the loading structure 4 in different locations on the loading structure 4, and means for rotating the spiral shaped channels 1, characterised in that the loading structure 4 is adapted to sequentially and repeatedly feed food items in liquid media into the two or more spiral shaped channels 1 without pulsing, wherein the loading structure 4 is rotatable with the two or more spiral shaped channels 1 and in-feeding only occurs when the loading structure is in a certain position or range in a 360° rotation of the two or more spiral shaped channels 1.

2. The apparatus according to claim 1, wherein the loading structure 4 further comprises guiding means for guiding the food items in liquid media into infeed end of each of the two or more spiral shaped channels 1.

3. The apparatus according to claim 1, wherein the apparatus further comprises an out-feed collecting structure 5 for collecting the food items in liquid media from each of the two or more spiral shaped channels 1.

4. The apparatus according to claim 3, wherein the outfeed collecting structure further comprises separate outlets configured to separate the food items in liquid media and an air/gas phase being fed out of the two or more spiral shaped channels 1.

5. The apparatus according to claim 4, wherein the apparatus further comprises an air/gas-duct 6 for re-directing the air/gas phase back to the loading structure 4.

6. The apparatus according to claim 5, wherein the air/gas-duct 6 further comprises a computer controlled valve configured to regulate a concentration of gas within the air/gas-duct 6.

7. The apparatus according to claim 1, wherein the means for rotating the spiral shaped channels 1 is a motor.

8. The apparatus according to claim 1, wherein two or more spiral shaped channels 1 are made from hose or pipe like flexible material.

9. The apparatus according to claim 8, wherein the three or more windings 8 of the two or more spiral shaped channels 1 are wound around or in a horizontally rotating frame/support structure 7.

10. The apparatus according to claim 1, wherein the three or more windings 8 of the two or more spiral shaped channels 1 are made from metal, wherein the metal is steel.

11. The apparatus according to claim 10, wherein the metal spiral shaped channels 1 are a load bearing structure being rotated for transferring and/or treating food items in liquid media.

* * * * *